United States Patent Office 3,702,881
Patented Nov. 14, 1972

3,702,881
REACTIVE HOT PRESSING AN OXIDE THROUGH ITS POLYMORPHIC PHASE CHANGE
Asoke Chandra Das Chaklader, Vancouver, British Columbia, Canada, assignor to Canadian Patents and Development Limited, Ottawa, Ontario, Canada
Continuation of application Ser. No. 713,922, Mar. 18, 1968, which is a continuation-in-part of application Ser. No. 418,282, Dec. 14, 1964. This application June 8, 1970, Ser. No. 48,804
Int. Cl. C04b 35/64; B22f 3/12, 3/16
U.S. Cl. 264—66                                                    11 Claims

ABSTRACT OF THE DISCLOSURE

A process for producing dense hard oxide and oxide-containing products from materials consisting of or containing an oxide capable of undergoing a polymorphic phase transformation when heated to a temperature of generally between 200° C. and 1200° C., which process includes heating the material to said transformation temperature and at least while the transformation is occurring, applying pressure to the material.

---

Figure 1:
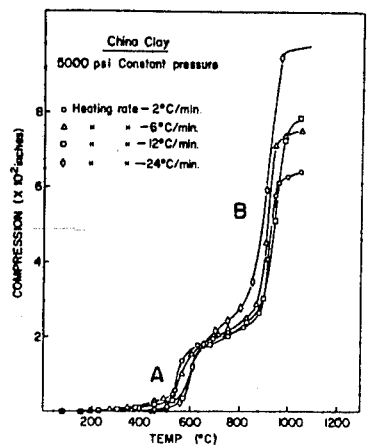

This application is a continuation of application Ser. No. 713,922, filed Mar. 18, 1968, and now abandoned, which was a continuation-in-part of application Ser. No. 418,282, filed Dec. 14, 1964 and issued to U.S. Pat. No. 3,379,523, on Apr. 23, 1968.

This invention relates to a process for preparing dense, hard products from various solid oxides including metal oxides, and to the improved products produced by the process. Even more particularly the present invention relates to a process for preparing dense, hard products containing a significant amount of at least one of zirconia ($ZrO_2$), alumina ($Al_2O_3$), iron oxide ($Fe_2O_3$), magnesia (MgO), beryllium oxide (BeO), uranium dioxide ($UO_2$-uranous oxide), thorium oxide ($ThO_2$), Talc, or Cermets containing a metal oxide and metal. In the specification which follows, particular emphasis will be placed on the preparation of those oxide products which are presently of substantial commercial significance.

In the past the what might be called "classical" process (as utilized to form products containing solid oxides, where indeed such formation has even been possible under any circumstances), has been to form the oxide-containing material into the required shape through the use of dies and a press and subsequently sinter the formed product at elevated temperatures (usually much above 1000° C.) to give it compressive strength and hardness. It is also known to sinter under pressure, this process being known generally as a "hot pressing" process.

These known processes possess many disadvantages. One is that the sintering time required is normally of the order of a number of hours to days above about 1400° C., the result being a very slow as well as expensive process insofar as the heat energy required is concerned.

A further disadvantage is that some refractory oxides, in particular $ZrO_2$, undergo a phase transformation involving a significant volume change at temperatures lower than the range required for the aforementioned "classical" fabrication techniques. Cooling of the formed body from the fabrication temperature through such phase transformation will result in extensive crack formation, such that the final product has very poor or no strength and no effective interparticle bonding. For this reason, non-stabilized zirconia cannot be fabricated by sintering or by standard hot pressing techniques, that is by subjecting the material to pressure while sintering. In fact insofar as is known very strong and dense non-stabilized zirconia could not be fabricated by any known conventional commercially feasible processes, prior to the present invention. It could only be used in powder form. Therefore non-stabilized zirconia products prepared by the process of the present invention will, of course, be unstable at temperatures above the phase transformation (1100° C.). However, there are many potential applications for these new products below this temperature.

It is known to fabricate zirconia by first stabilizing it and subsequently fabricating it by conventional fabrication techniques. Stabilized zirconia is zirconia which has no phase transformation, this transformation having been suppressed by making a solid solution of the zirconia with other materials such as for example CaO.

Non-stabilized zirconia is a very non-reactive oxide and therefore is highly desirable as crucible or refractory material. In the past as previously indicated, the practice has been to utilize stabilized zirconia when forming zirconia-containing structures but one disadvantage of this process is obvious in that the preparation of the solid solution requires suitable mixing apparatus, a problem which could be avoided if non-stabilized zirconia could be utilized as a starting material. The process of the present invention is particularly suited for producing very dense (greater than 99%) non-stabilized zirconia products of all sizes and shapes. Obviously the advantages of being able to produce commercially such a product are substantial.

Also known in the process disclosed in U.S. application Ser. No. 402,654, filed Oct. 8, 1964, in the name of Chaklader and McKenzie now issued Oct. 24, 1967, as U.S. Pat. 3,348,957. In that process clays, mostly alumino-silicates, are subjected to pressure while undergoing dehydroxylation. On the other hand the present process is directed to the formation of dense, hard, metal oxide-containing materials utilizing a crystal phase change or a decomposition reaction to free the crystal bonds. In the case of, for example, alumina, the process of the present invention is very similar and/or an extension to that disclosed in Ser. No. 402,654 for alumino-silicates depending upon the starting materials employed and the characteristics required for the final product. By decomposition is meant any reaction which involves loss of mass by forming a vapour phase during the reaction. This also involves atom movements in the solid lattice, i.e. from its stable position to another position and not thermal vibration.

It is the principal object of the present invention to provide an improved process for forming solid oxides and in particular metal oxides or mixtures thereof with other metal or reinforcing filler material, which process can normally be carried out more economically and with better results than known long-used processes to yield a product having characteristics which are similar to those previously obtainable by any means. There are also provided certain novel products.

Figure 2:
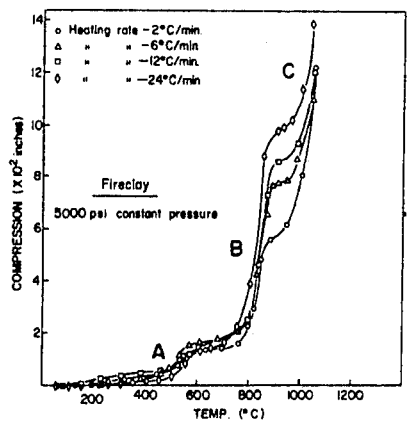
Figure 3:
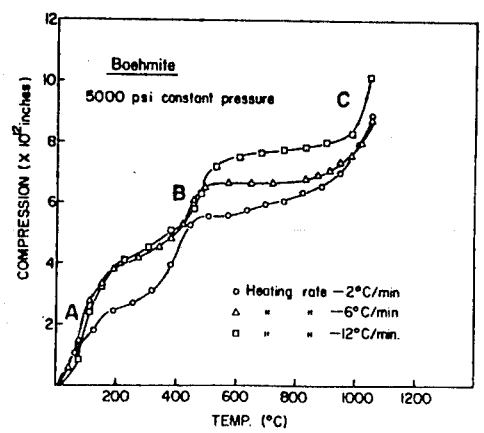
Figure 4:
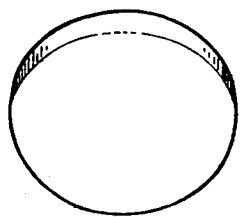
Figure 5:
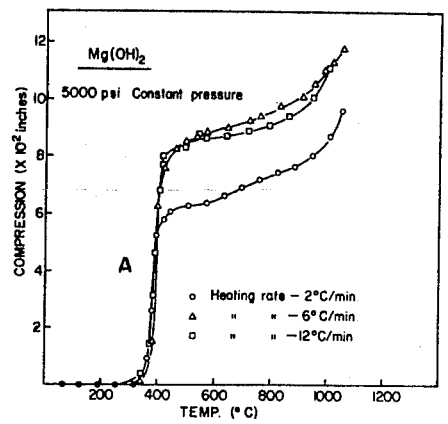

In the attached drawings:
FIG. 1 is a graph showing compaction curves of china clay as a function of temperature under 5000 p.s.i.;
FIG. 2 is a graph showing compaction curves of Fire-clay as a function of temperature under 5000 p.s.i.;
FIG. 3 is a graph showing compaction curves of Boehmite (AlOOH) as a function of temperature under 5000 p.s.i.;
FIG. 4 shows a typical dense pellet of $ZrO_2$ fabricated by reactive hot-pressing; and
FIG. 5 is a graph showing compaction curves of magnesium hydroxide as a function of temperature under 5000 p.s.i.

The process of the present invention essentially involves the application of pressure during a heat-initiated molecular bond disruption caused by the polymorphic transformation of a solid oxide. The process of this invention is particularly suitable for use in fabricating and highly densifying materials. The required phase transformation generally occur well below the usual sintering temperatures, often with the obvious result of the present process requiring much less heat energy than known processes.

In the case of oxides other than zirconia, such as alumina, magnesia, beryllia, thoria, urania and iron oxides, the materials can be fabricated and densified by the process of this invention using a decomposition reaction. The starting materials would be any compounds such as carbonates, bicarbonates, sulphates, nitrates, hydroxides, hydrated hydroxides, oxalates etc. which on decomposition would yield an oxide or mixture of oxides. In this particular embodiment the chemical composition of the starting materials would be different from the final products. Alumina, iron oxide and Cermets can be also subjected to the process of this invention at a temperature causing crystal phase change in addition to using a decomposition reaction, i.e. a combination of the two.

In carrying out the process of this invention the raw material is formed to the required shape in a die and then heated to a temperature sufficient to cause at least some decomposition and/or a polymorphic transformation of the material to occur, the temperature necessary being normally less than 1200° C. and frequently in the range 300–800° C. Pressure is applied while the decomposition reaction or transformation is occurring. The heat and pressure can then be removed from the formed product and it will be found that the product will have very high compressive strength and high density. To obtain comparable strength and density in the refractory oxides mentioned above, it is generally necessary to sinter them at temperatures considerably above 1400° C. for a prolonged period of time. Also normally improved by the process of the invention will be dimensional tolerances of the finished product.

Use of the process of this invention can also eliminate certain intermediate steps such as prefabrication, drying, etc. now used in known processes with obvious economical advantages.

The raw materials, which may have been first "flash heated" if necessary, may be heated while still in the forming die or may be removed from the die and then otherwise suitably heated to the require temperature and pressed. If left in the die then pressure may be readily applied during a decomposition reaction or transformation through the die and its associated press. Otherwise other means, which may include impact or hammer blows or any other continuous pressure transmitting device can be provided. Of course, any preliminary flash heating without pressure of the starting materials before being subjected to the process of this invention, must be limited so as not to cause decomposition or transformation of the entire bulk of starting material or the benefits of the present invention will be lost.

Normally it will be convenient to form the oxide product in a die and while maintaining pressure on the product, heat it to the necessary temperature whereupon the heat source and the pressure may be removed and the finished product removed from the die.

Alternatively, the raw materials may be preheated to a temperature below the decomposition or phase transformation temperature separately and then hot-pressed during the phase transition. The phase transition temperature normally would be higher than the preheating temperature.

The particularly unique aspect of this discovery is that a considerable densification and strengthening can be achieved by utilizing a temperature substantially less than the usual sintering or standard hot pressing temperature for the material involved. From the commercial standpoint this decrease in the temperature necessary to achieve densification and strengthening is of particular significance in that dies suitable for use in the process of the present invention can be made of materials currently commercially available at a reasonable cost. Additionally, because of the lower temperatures, heating costs will be substantially reduced.

A further significant aspect of the process of this invention is the relatively short period of time required for densification of oxide products as compared with known processes. The time requirement is dependent on two factors—that length of time to bring the mass of material forming the product up to the required temperature and the reaction or polymorphic transformation rate at any temperature. The process can be completed in the order of minutes by choice of a suitable temperature.

In carrying out the process of the invention, any form of heat and pressure source may be used which is sufficient to both exert the required pressure, and heat the raw material to form the finished product to the required temperature in the required time. The process can be carried out in air, nitrogen or any inert atmosphere, and the die used should be such as to permit the escape of gases formed during application of heat and pressure.

As indicated the material used to form the oxide products may include any compounds which on heating decompose to produce an oxide or oxides as well as, of course, materials in oxide form which on heating undergo a polymorphic transformation. If required, these raw materials before being subjected to the process of the present invention, may be mixed with fillers and/or reinforcing materials such as metallic or non-metallic fibres, natural rocks (powdered), sands, or even precalcined raw materials and also metal powders to produce cermets (that is ceramic-metal composites, and metal-ceramic laminates). Depending upon the conditions used it may be possible to enhance the physical properties of the product by reinforcement with metal powders.

In the case of iron oxides, siderite ($FeCO_3$) can be sintered by using its decomposition reaction $$FeCO_3 \rightarrow FeO + CO_2$$

which if carried out in air or oxygen subsequently will be transformed into $Fe_3O_4$ and $Fe_2O_3$, all under pressure. Electrical insulators can be produced from mixtures of alumino-compounds (which on decomposition will give $Al_2O_3$) and talc. Talc is a hydrated magnesium silicate, which also decomposes at about 1000° C. and water molecules are eliminated from the structure. The decomposition reactions of both the alumino-compounds and talc can be utilized for densification and fabrication of electrical insulators. Commercial spark plugs are also made from a similar composition or from pure alumina. Dense MgO can be produced by using a decomposible compound such as $Mg(OH)_2$ which on decomposition will give MgO and when the reaction is made to occur under pressure, very dense MgO can be produced and fabricated. Similarly decomposition reactions can be utilized (under pressure) for fabrication and densification of, for example, $UO_2$, $ThO_2$ and BeO.

In the case of alumina, materials already fabricated and densified by the process of this invention using a decomposition reaction can be further densified and strengthened by the use of polymorphic transformations under pressure (see for example FIGS. 1, 2 and 3). Materials already prepared by applying pressure during a dehydroxylation reaction, including clays in accordance with the application referred to above, may be ground and finally fabricated into any shape and size by the process of this invention, that is using polymorphic transformations. To achieve complete densification, more than one phase transformation will be used as shown in FIGS. 1, 2 and 3, where compaction against phase transitions are shown. In the case of reversible transformation, such as in $ZrO_2$, the materials will be cycled through the phase transformation temperature range under pressure to achieve the desired density of the products.

Generally speaking, the process of this invention can also be used as an intermediate step in any process of fabrication and/or densification. For example, as noted above, materials (excluding non-stabilized $ZrO_2$) can be subjected to the process of this invention and subsequently sintered at a higher temperature for final processing. For example, $Mg(OH)_2$ or $MgCO_3$ can be first densified in the range 65–80% of the theoretical density. Subsequent to this processing, firing at 1500° C. (or over) would achieve a density in the range of 80 to nearly about 100%. This final step would also stabilize the highly reactive MgO produced during the hot-pressing step. For another example, there are several transformations in alumina in the temperature range of 200–1150° C. as shown in Table 3. All or some of these reactions may be used under pressure for fabrication and/or densification. In FIG. 3, compaction of a powder compact of Boehmite with increasing temperature and under a constant pressure is shown. For densification purposes all or any of the steps A, B and C can be utilized. However, as expected, to achieve the highest density obtainable all three steps should be used. Hot-pressing through these steps would result in a product, having a density in the range 60–85% (i.e. 40–15% porosity). A final firing at a temperature of over 1500° C. will densify the product up to 98% of the theoretical (or about 100%) density. Iron oxide can be produced and fabricated in all shapes and sized by using $Fe(OH)_2$ or $FeCO_3 \rightarrow FeO \rightarrow Fe_3O_4 \rightarrow Fe_2O_3$ phase transformations while under pressure. However, it should be pointed out here that these transformations are slow processes and response to the reactive hot pressing would vary very widely, depending upon the extent of the structural rearrangements that take place during those transformation processes.

As indicated in carrying out the process of the present invention, the raw materials involved must undergo (at least partially) a polymorphic transformation initiated by the application of heat while the material is under pressure. The pressure which is used will vary widely, there being theoretically no known upper limit and any pressure which it is practically possible to obtain can be used to control the final characteristics of the product in that normally the greater the pressure utilized during the phase transformation the greater will be the density of the final product and also the greater will be its compressive strength. Also any practical means can be utilized to apply the required pressure. Pressures within the practical range of 2000 to 25,000 p.s.i. have been used.

In the case of very rapid polymorphic transformations such as those which occur for example in zirconia, in carrying out the process of the present invention the oxide can, normally with some benefit, be cycled through the transformation temperature or temperature range in that there is a hysteresis effect in the temperature of transformation, with of course the cycling being carried out while the oxide is maintained under pressure, either constant or variable.

Subsequently if required, pressure can be again applied to or maintained on the product (excluding non-stabilized $ZrO_2$) while the product is heated to a temperature which is higher than the first transformation temperature thereby to obtain further possible densification of the product. In some instances the product can also with benefit be subjected to a higher temperature heat treatment without application of pressure in order to obtain the desired density and final stable crystal phases, necessary for the stability of the products.

To achieve maximum product strength and density, where a polymorphic transformation is being utilized, pressure must be applied before the transformation temperature or temperature range of the oxide involved in the starting material is reached (in the case of irreversible transformations) and furthermore in the case of reversible transformations the pressure must be maintained until the transformation process is completed. Pressure should also preferably be applied before the decomposition temperature of the decomposable material in the starting material is reached and maintained until completion of the reaction. However significant benefits are realized even if the pressure is applied only during at least part of the transformation or decomposition.

The actual temperature or temperature range employed will vary from oxide to oxide or compound to compound and is also altered by the presence of impurities in the oxide or compound. It has been further observed that the temperature or temperature range to be used will frequently depend on such factors as the thermal history, origin, impurity content, and grain size of the oxide or compound, (and as the case may be) added materials, employed. Also the time factor involved in carrying out the process of the present invention has been found to be dependent on a number of variables and as a result no specific temperature or temperature range or rate of transformation can be specified, in general it being necessary to consider each oxide or compound individually. As a result of these variables it has been found that the response of any particular oxide to the process of the present invention varies widely and appears to depend primarily upon the structural changes which accompany the transformation. For example it has been observed that the final transformation reactions which result in the formation of alpha-alumina respond best to the process, this transformation normally occurring at a temperature of about 1150° C. In the case of iron oxide ($Fe_2O_3$) the $\gamma$ to the $\alpha$ transformation responded well to the process.

The following examples are given for the purpose of illustrating the present invention without being intended to limit its scope.

EXAMPLE 1

Analytical grade zirconia ($ZrO_2$ approximately 97% $ZrO_2$—purified and anhydrous—available as a Fisher Laboratory Chemical from the Fisher Scientific Company) was compacted into a cylinder having approximate dimensions of 1 centimeter in diameter and 1 centimeter in height using a hand press.

The hot pressing was carried out in a Phillips induction heating unit using a graphite die which functioned both as a susceptor and hot pressing component.

The cylindrically shaped specimen was placed in the graphite die which was provided with floating plungers and the die was placed in position in a press provided with a pneumatic ram fed from a gas cylinder with the pressure control being regulated by a gas regulator. The die was encased in Vycor tubing and the complete apparatus was flushed with argon for five minutes to protect the graphite die. A pressure of 4,000 p.s.i. was applied to and maintained on the specimen while the specimen was cycled very slowly through the temperature range noted below in Table 1, that is using about 30 minutes for each cycle so that during cycling under pressure the reversible phase transition (monoclinic ⇌ tetragonal) occurred. As a final step before the specimens were tested, they were subsequently heated in air at 700° C. for 45 minutes without being subjected to any pressure to burn off the carbon on the surface of the specimens and to re-oxidize them in case they were reduced by the graphite forming the die during the hot pressing. The results were as follows.

TABLE 1

[Results of cylical reactive hot pressing of non-stabilized $ZrO_2$ (reversible transformation)]

| Number of cycles from 800–1,200° C | 1 | 3 | 7 | (1) |
|---|---|---|---|---|
| Density (gm./cc.) | 4.35 | 4.68 | 5.56 | 5.50 |
| Percent theoretical density | 77 | 84 | 99.3 | 98.3 |
| Compressive strength, p.s.i. | 20,000 | 39,000 | 55,000 | (2) |

[1] No cycling, pressure applied and specimen heated to 1,500° C. for 1 hour.
[2] No strength (failure due to recrystallization).

EXAMPLE 2

Following the general procedure set out in Example 1, and again utilizing a pressure of 4,000 p.s.i. the following results were obtained on pure zirconia (99.7% $ZrO_2$, impurities, Hf—100 p.p.m., Ca—155 p.p.m., Mg—110 p.p.m. and Si—320 p.p.m., average grain size 0.45 micron as supplied by A. D. MacKay, Inc., New York, N.Y.) using the temperature range set out below.

(C) Colloidal boehmite (alpha monohydrate) was decomposed at 600° C. without pressure to obtain gamma-alumina which being subjected to the same general pro-

TABLE 2

[Results of cyclical reactive hot pressing of non-stabilized $ZrO_2$ (reversible transformation)]

| Specimen Number | A | B | C | D | E |
|---|---|---|---|---|---|
| No. of cycles 750–1,200° C | 3 | 6 | 12 | 6 | No cycling, hot pressing at 1,500° C. 20 minutes.[1] |
| Reheat under pressure: | | | | | |
| At | | 1,400–1,500° C | 1,450° C | 1,500° C | |
| Time | | 25 min | 5 min | 1 hour | |
| Percent theoretical density | 86 | >98 | 98 | 95 | 98. |
| Compressive strength, p.s.i. | 29,000 | ~50,000 | ~50,000 | No strength | No strength. |

[1] Pressure applied when temperature reached.

EXAMPLE 3

Following Table 3 noted below, different forms of alumina were obtained as follows:

TABLE 3

Decomposition and transformation sequences of alumina hydrates in dry air

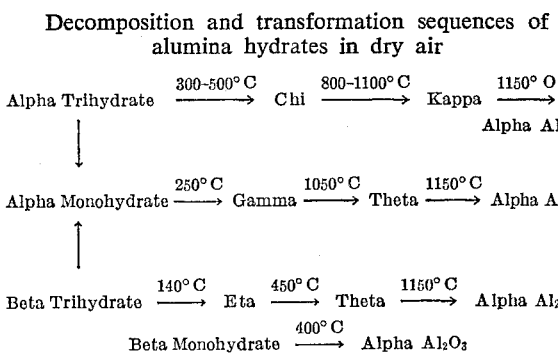

(A) Gibbsite (alpha-trihydrate) was decomposed at 650° C. without pressure to obtain chi-alumina. The chi-alumina so obtained was then subjected to the same general process as outlined in Example 1 without cycling with the following results.

TABLE 4

[Results of reactive hot pressing of $Al_2O_3$ using polymorphic irreversible transformations]

| Specimen Number | $G_1$ | $G_2$ | $G_3$ | $G_4$ |
|---|---|---|---|---|
| Max. temperature (° C.) | 650 | 700 | 1,070 | 1,050 |
| Pressure applied at (° C.) | 650 | 700 | 600–1,070 | 1,050 |
| Applied pressure (p.s.i.) | 12,000 | 12,000 | 12,000 | 12,000 |
| Time (min.) | 10 | 10 | 10 | 10 |
| Density (gm./cc.) | 1.28 | 1.22 | 1.45 | 1.41 |
| Compressive strength (p.s.i.) | 1,100 | 1,740 | 9,000 | 7,450 |

(B) Bayerite (beta trihydrate) was decomposed at 600° C. without pressure to obtain theta-alumina which was subjected to the same general procedure as outlined in Example 1 without cycling, with the following results.

cedure as outlined in Example 1 without cycling yielded the following results.

TABLE 6

[Results of reactive hot pressing of $Al_2O_3$ using polymorphic irreversible transformations]

| Specimen Number | $C_1$ | $C_2$ |
|---|---|---|
| Temperature (° C.) | 650 | 1,150 |
| Pressure applied at (° C.) | 650 | 700 |
| Applied pressure (p.s.i.) | 10,000 | 10,000 |
| Time (min.) | 10 | 10 |
| Density (gm./cc.) | | 2.30 |
| Compressive/strength (p.s.i.) | Spalled | 40,000 |

EXAMPLE 4

Ferric sulphate (hydrated) decomposed at 750° C. without pressure to produce $\gamma Fe_2O_3$ was subjected to the same general procedure as outlined in Example 1 without cycling with the following results.

TABLE 7

| | |
|---|---|
| Maximum temperature reached ° C | 1030 |
| Time (min) | 5 |
| Pressure applied at ° C | 800 |
| Applied pressure p.s.i. | 10,000 |
| Compressive strength p.s.i. | 10,000 |

EXAMPLE 5

Following the general procedure set out in Example 1 the following results were obtained on Cermets-Ceramic-metal composites, iron and $Al_2O_3$ composites (powder mixtures).

TABLE 5

[Results of reactive hot pressing of $Al_2O_3$ using polymorphic irreversible transformations]

| Specimen Number | $B_1$ | $B_2$ | $B_3$ | $B_4$ | $B_5$ | $B_9$ |
|---|---|---|---|---|---|---|
| Temperature (° C.) | 600 | 650 | 1,200 | 1–250 | 820 | 950 |
| Pressure applied at (° C.) | | 650 | 650–1,200 | 1,250 | 820 | 680–950 |
| Applied pressure (p.s.i.) | 10,500 | 10,000 | 9,000 | 9,000 | 9,000 | 9,000 |
| Time (min.) | 10 | 10 | 5 | 5 | 5 | 5 |
| Density (gm./cc.) | 1.18 | 1.67 | 1.60 | 1.16 | 1.26 | |
| Compressive strength (p,s.i.) | (1) | 1,100 | 14,000 | 10,000 | 1,750 | 2,720 |

[1] No strength.

TABLE 8

| Weight ratio Fe:Al$_2$O$_3$ | Applied pressure, p.s.i. | Temperature hot pressing, °C. | Hot pressing time, min. | Cold compressive strength, p.s.i. | Bulk density, gm./cc. |
|---|---|---|---|---|---|
| 20:80 | 10,000 | 650 | 10 | 30,000 | 2.27 |
| 50:50 | 10,000 | 570 | 10 | 37,000 | 3.47 |
| 80:20 | 10,000 | 550 | 10 | [1] 49,000 | 5.26 |
| Other cermets | | | | | |
| Cu:Al$_2$O$_3$ | | | | | |
| 50:50 | 6,000 | 570 | 10 | >50,000 | 3.80 |
| Cr:Al$_2$O$_3$ | | | | | |
| 50:50 | 6,000 | 590 | 10 | 48,500 | 3.20 |

[1] Yield strength.

EXAMPLE 6

Following the general procedure set out in Example 1, cermets having a ¾" diameter and composed of 77% chromium powder (Union Carbide Ltd.) and 23% alumina (Boehmite-Du Pont Ltd.) were processed. The main purpose of these tests is to show the effect of temperature and pressure changes on the properties of cermets produced according to the present invention. The following results were obtained:

the general chemical formula of $Ca_xZr_{1-x}O_{2-x}$, where $x$ varies from 0.12 to 0.20, by hot-pressing during the monoclinic

tetragonal phase transformation of $ZrO_2$. For example the reagent grade $Ca(OH)_2$ and Zirconium dioxide (99.7% $ZrO_2$ supplied by A. D. MacKay, Inc., New York) were

TABLE 9

| Chromium, wt. percent | Al$_2$O$_3$, wt. percent | Temp., °C. | Time, min. | Pressure, p.s.i. | Density, gm./cm.³ | Hardness, Rockwell A | Hardness, Rockwell C |
|---|---|---|---|---|---|---|---|
| 77 | 23 | 400 | 10 | 3,500 | 2.60 | | |
| 77 | 23 | 650 | 10 | 3,500 | 2.52 | 24 | |
| 77 | 23 | 800 | 10 | 3,500 | 2.67 | | 28 |
| 77 | 23 | 1,000 | 10 | 3,500 | 4.13 | 47 | |
| 77 | 23 | 1,200 | 10 | 3,500 | 5.56 | | 37 |
| 77 | 23 | 800 | 10 | 6,000 | | | 21.0 |
| 77 | 23 | 1,000 | 10 | 6,000 | | | 32.0 |
| 77 | 23 | 1,200 | 10 | 6,000 | 5.78 | | 39.5 |
| 77 | 23 | 1,200 | 20 | 6,000 | 5.79 | | 40.0 |
| 77 | 23 | 1,200 | 40 | 6,000 | 5.81 | | 39.5 |
| 77 | 23 | 1,200 | 60 | 6,000 | 5.85 | | 39.5 |
| 77 | 23 | 1,200 | 10 | 10,000 | | | 39.0 |
| 77 | 23 | 1,200 | 20 | 10,000 | | | 39.5 |
| 77 | 23 | 1,200 | 30 | 10,000 | | | 38.5 |
| 100 | | 800 | 10 | 6,000 | | 44.0 | |
| 100 | | 1,000 | 10 | 6,000 | | 61.0 | |
| 100 | | 1,200 | 10 | 6,000 | | 50.0 | |
| 100 | | 1,200 | 30 | 6,000 | | 50.0 | |
| Commercial product prepared by known commercial process | | | | | | | |
| 77 | 23 | 1,850–1,900 | [1] 12–24 | | 5.7–5.8 | | 37–39 |

[1] Hours.

The first sequence of tests was performed with varying temperatures while maintaining the pressure and time constant. It is shown in Table 10 that the best properties are obtained at temperatures which cause the alpha transformation of alumina to take place. These tests were performed at 400°, 650°, 800°, 1000° and 1200° C. at pressures of 3500 p.s.i. and 6000 p.s.i. Time was varied for 1200° C. runs at pressures of 6000 p.s.i.

The effect of time on cermets after alpha transformation of alumina is complete, is such that those produced at 1200° C. for ten minutes had similar properties to those produced at 1200° C. for 60 minutes.

Density of the cermets changed with applied pressures. Increasing the pressure results in increased density.

EXAMPLE 7

CaO+ZrO$_2$—Cubic solid solution

Cubic solid solutions of CaO and $ZrO_2$ can be made from mixtures of Ca CO$_3$ [or Ca(OH)$_2$] and $ZrO_2$ having mixed in such a proportion that the final compound would have the composition of the cubic solid solution $$Ca_{0.15}Zr_{0.85}O_{1.85}$$

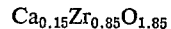

The mixture was shaped into cylindrical pellets 1 cm. in diameter and 1 cm. in weight. Then pellets were reactive hot-pressed, i.e., cycled one or more times through the temperature range of the monoclinic⇌tetragonal transformation of $ZrO_2$ under an applied pressure of 6000 p.s.i. using the apparatus of Example 1. After reactive hot-pressing the compositions of the mixture were determined by X-ray diffraction techniques. The experimental conditions used and the results obtained are shown in Table 10.

Usually additional hot pressing or sintering is necessary for fabrication and densification.

The solid-solution of $Ca_xZr_{1-x}O_{2-x}$ can be hot-pressed or sintered at a higher temperature for further densification.

TABLE 10

[Results of Reactive Hot Pressing Mixtures of $CaCO_3$ or $Ca(OH)_2$ with $ZrO_2$]

| Temperature range of cycling, °B. | Applied pressure (p.s.i.) | Number of cycles | Phases present | Weight percent of $Ca_{0.15}Zr_{0.85}O_1$. Weight percent of $Ca_{0.15}Zr_{0.85}O_{1.85}$ |
|---|---|---|---|---|
| 750–1,200 | 6,000 | 1 | $ZrO_2$ and $Ca_{0.15}Zr_{0.85}O_{1.85}$. | 40±10 |
| 750–1,200 | 6,000 | 2 | $ZrO_2$ and $Ca_{0.15}Zr_{0.85}O_{1.85}$. | 60±20 |
| 750–1,200 | 6,000 | 3 | $Ba_{0.15}Zr_{0.85}O_{1.85}$. | >95 |
| 750–1,200 | 8,000 | 1 | $ZrO_2$ and $Ca_{0.15}Zr_{0.85}O_{1.85}$. | 70±10 |

EXAMPLE 8

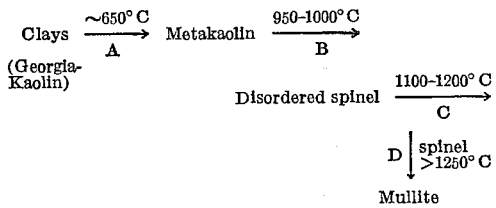

Successive stages of compaction of Georgia kaolin are shown in FIG. 1. Steps A and B have been identified in the figure. Step A is during the dehydroxylation reaction and steps B, C and D are during the crystallographic transformation. The bulk density of Georgia kaolin pellets after compacting through steps A and B is 80–95% i.e. 5–20% porous. Final sintering at 1200° C. (or over) will stabilize and densify the clay products further. The apparatus and general procedure used in Example 1, can be used in this and the following two examples.

EXAMPLE 9

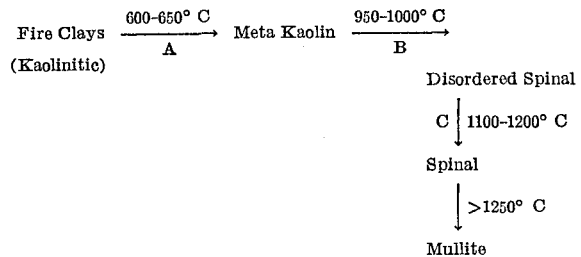

Successive stages of compaction of a British Columbia fire clay are shown in FIG. 2. Steps A, B and C are shown in FIG. 2. Step A is during the dehydroxylation reaction. Steps B and C are during the crystallographic (i.e. polymorphic) phase change. The bulk density of these fire clay pellets after compacting through steps A, B and C is over 95% i.e. less than 5% porosity. Final sintering at 1200° C. (or over) will stabilize and densify the clay products.

EXAMPLE 10

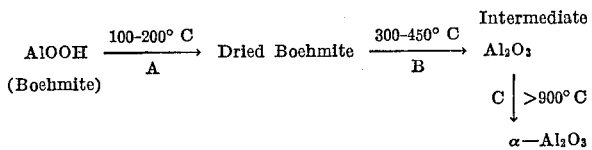

Successive stages of compaction of Boehmite supplied by Du Pont Ltd. (trade name "Baymal") are shown in FIG. 3. Steps A, B, and C are identified in the figure. Steps A and B are during the removal of $H_2O$, both absorbed and dehydroxylation. Step C is during the crystallographic change. The bulk density of the pellets after compacting through step C is over 75% (and frequently about 85%) i.e. less than 25% porosity. A final firing at 1500° C. (or over) produces commercial quality products.

EXAMPLE 11 (MAGNESIUM SILICATES)

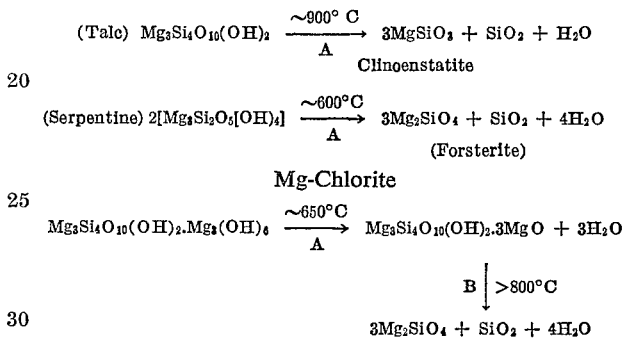

A high density magnesium silicate such as forsterite (a commercial product) can be produced by compaction using dehydroxylation (step A) and crystallographic transformation (step B). For example, talc can be hot-pressed at 1050° C. (20 mins.) under a pressure of 6000 p.s.i. (range 5,000–12,000 p.s.i.) to produce a dense body of 95% (range 90–95%), i.e. 5% porosity. Both serpentine and Mg-chlorite can be hot-pressed to 600° C. and 800° C. respectively to obtain a high density body. This hot-pressed pellet may be fired at 1300° C. (or over) to stabilize and densify further, if necessary. The general procedure and apparatus used in Example 1 could be utilized here.

In summary an improved, novel process for manufacturing dense, hard oxide containing products has been provided which process involves in one of its broadest aspects the heating of a formed composition containing a significant amount of an oxide to a temperature sufficient to cause molecular bond disruption by one or more of polymorphic phase transformations in the oxide and applying pressure to said composition during said bond disruption.

I claim:

1. A reactive hot pressing process for manufacturing dense, hard, refractory oxide products and oxide-containing products from oxide materials which undergo a polymorphic phase change at a temperature below 1250° C. said process consisting essentially of:

heating said oxide material consisting essentially of such oxide just through the temperature at which a polymorphic phase change occurs in said oxide material, said temperature being not above 1250° C.;

applying pressure of at least 2000 p.s.i. to said material while the polymorphic phase transformation is taking place and while said article is below about 1250° C.;

then removing the material from the influence of the applied pressure as soon as the polymorphic phase transformation has been completed; and recovering the resulting dense, hard, refractory product.

2. A reactive hot pressing process for manufacturing dense, hard, refractory oxide products and oxide-containing products from oxide materials which undergo a polymorphic phase change at a temperature below 1250° C., said process consisting essentially of:

providing a charge consisting essentially of at least one such oxide material which on heating to a temperature below 1250° C. undergoes a polymorphic phase transformation;

heating said charge just through said polymorphic phase transformation temperature of less than 1250° C. and at least while the polymorphic phase transformation is occurring, applying pressure to the charge, the application of pressure simultaneously with said heat-initiated polymorphic phase transformation resulting in the shaping, strengthening and densifying of said charge, the temperature of said heating being below about 1250° C. and not substantially greater than the temperature of said polymorphic phase change throughout the application of pressure to said charge; and recovering the resultant dense oxide product or oxide-containing product.

3. The process of claim 2 wherein pressure is applied to said charge while it is confined in a mould cavity.

4. The process of claim 2 wherein said oxide is zirconia.

5. The process of claim 2 wherein said oxide is alumina.

6. The process of claim 2 wherein the composition is a mixture of calcium oxide and zirconium dioxide and the temperature to which it is heated ranges from 750° C. to 1250° C.

7. A reactive hot pressing process for manufacturing dense, hard, refractory oxide products and oxide-containing products from oxide materials which undergo a polymorphic phase change at a temperature below 1250° C., said process consisting essentially of:

providing a charge consisting essentially of at least one such oxide material which on heating to a temperature below 1250° C. undergoes a polymorphic phase transformation;

heating said charge just through said polymorphic phase transformation temperature of less than 1250° C. and at least while the polymorphic phase transformation is occurring, applying pressure to the charge, the application of pressure simultaneously with said heat-initiated polymorphic phase transformation resulting in the shaping, strengthening and densifying of said charge, the temperature of said heating being below about 1250° C. and not substantially greater than the temperature of said polymorphic phase change throughout the application of pressure to said charge; and recovering the resultant dense oxide product or oxide-containing product and thereafter cycling said composition through said temperature at least twice.

8. The process of claim 7 wherein the cycling temperature is from about 750° C. to about 1250° C.

9. The process of claim 7 wherein the final products are dense zirconia-containing products.

10. A reactive hot pressing process for manufacturing dense, hard, refractory oxide products and oxide-containing products from oxide materials which undergo a polymorphic phase change at a temperature below 1250° C., said process consisting essentially of:

providing a charge consisting essentially of at least one such oxide material which on heating to a temperature below 1250° C. undergoes a polymorphic phase transformation;

heating said charge just through said polymorphic phase transformation temperature of less than 1250° C. and at least while the polymorphic phase transformation is occurring, applying pressure to the charge, the application of pressure simultaneously with said heat-initiated polymorphic phase transformation resulting in the shaping, strengthening and densifying of said charge, the temperature of said heating being below about 1250° C. and not substantially greater than the temperature of said polymorphic phase change throughout the application of pressure to said charge; and thereafter heating the resultant product without the application of pressure to a temperature above that to which it was heated to cause said polymorphic phase transformation, so as to further increase the density of, and stabilize the resultant product and then recovering the resultant dense oxide product or oxide-containing product.

11. A reactive hot pressing process for manufacturing dense, hard, refractory oxide products and oxide-containing products from oxide materials which undergo a polymorphic phase change at a temperature below 1250° C., said process consisting essentially of:

providing a charge consisting essentially of at least one such oxide material which on heating to a temperature below 1250° C. undergoes a polymorphic phase transformation;

heating said charge just through said polymorphic phase transformation temperature of less than 1250° C. and at least while the polymorphic phase transformation is occurring, applying pressure to the charge, the application of pressure simultaneously with said heat-initiated polymorphic phase transformation resulting in the shaping, strengthening and densifying of said charge, the temperature of said heating being below about 1250° C. and not substantially greater than the temperature of said polymorphic phase change throughout the application of pressure to said charge; and thereafter heating without the application of pressure the resultant product to a temperature above that to which it was heated to cause said polymorphic phase transformation so as to further increase the density of and stabilize the resultant product, and wherein the composition is a mixture of calcium oxide and zirconium dioxide and then recovering the resultant dense oxide product or oxide containing product.

References Cited

UNITED STATES PATENTS 3,405,207   10/1968   Vahldiek et al. _____ 264—332

OTHER REFERENCES

David Weiss et al.: "Hot-Pressing a Simple Petalite-Clay Body," Ceramic Bulletin, February 1961 at 66–67.

P.E.D. Morgan et al.: "Formation of Fully Dense Oxides by Pressure Calcintering of Hydroxides," Sintering and Related Phenomena, 1967, Gordon & Breach, at 861–894.

JULIUS FROME, Primary Examiner

J. H. MILLER, Assistant Examiner

U.S. Cl. X.R.

264—125, 332, 0.5; 75—2.4